United States Patent [19]

Horng

[11] Patent Number: 5,080,758

[45] Date of Patent: Jan. 14, 1992

[54] CHEMI-MECHANICAL LINER BOARD

[75] Inventor: Arbeit J. Horng, Burnaby, Canada

[73] Assignee: MacMillan Bloedel Limited, Canada

[21] Appl. No.: 562,509

[22] Filed: Aug. 2, 1990

[51] Int. Cl.$^5$ .............................................. D21H 11/08
[52] U.S. Cl. ..................................... 162/130; 162/129; 162/142; 162/149
[58] Field of Search ................ 162/129, 130, 149, 91, 162/147, 142

[56] References Cited

U.S. PATENT DOCUMENTS

| | | | |
|---|---|---|---|
| 4,145,246 | 3/1979 | Goheen et al. | 162/23 |
| 4,431,479 | 2/1984 | Barbe et al. | 162/9 |
| 4,781,793 | 11/1988 | Halme | 162/55 |
| 4,888,092 | 12/1989 | Prusas et al. | 162/149 |
| 4,938,843 | 7/1990 | Lindhal | 162/149 |

FOREIGN PATENT DOCUMENTS

| | | | |
|---|---|---|---|
| 8503316 | 11/1985 | PCT Int'l Appl. | 162/129 |
| 0606913 | 5/1978 | U.S.S.R. | 162/149 |

Primary Examiner—Peter Chin
Assistant Examiner—Brenda Lamb
Attorney, Agent, or Firm—C. A. Rowley

[57] ABSTRACT

A sheet having substantially all of the qualities of liner board is formed solely from mechanical pulp using two different stocks to form discrete layers, one of the layers being preferably at least 50% coarse chemi-mechanical pulp and at least one surface layer being preferably of a chemi-mechanical fine pulp. Preferably the coarse layer will be a chemi-thermo-mechanical Douglas Fir pulp and the fine pulp will be a chemi-thermo-mechanical Western red cedar pulp.

21 Claims, 2 Drawing Sheets

CHEMI-MECHANICAL LINER BOARD

FIELD OF THE INVENTION

The present invention relates to a new form of liner board. More particularly the present invention relates to a liner board formed from two different types of fibres, one type forming a coarse fibre core layer and another a surface forming fine fibre layer formed by mechanically liberating the fibres.

BACKGROUND OF THE PRESENT INVENTION

The term fine pulp or fine fibres as used herein means fibres having a maximum diameter of less than 25 microns, a wall thickness of up to 2.5 microns and an aspect ratio of length to diameter of about 10. The term coarse pulp or coarse fibre as used herein means fibres having a diameter of at least 30 microns, a wall thickness of at least 13 microns and an aspect ratio of length to diameter of about 10.

Generally liner board is formed substantially solely from Kraft pulp which has been found necessary to provide the strength required. The liner is then laminated with a corrugated corrugating medium to form a single face and eventually with a second liner to form conventional corrugated board.

Western Red Cedar is used to make unbleached, bleached kraft or semibleached kraft pulp that finds use in a coating base stock, reinforcing fibre in newsprint or groundwood printing papers for making surgical gowns, etc.

When Western Red Cedar is mechanically pulped it has been found that it produces predominantly fine fibre pulp.

Mechanical pulping of Douglas Fir produces a relatively coarse fibre. The coarseness of the fibre can be varied depending on the degree of refining or secondary refining to which the fibres are subjected.

BRIEF DESCRIPTION OF THE PRESENT INVENTION

It is an object of the present invention to provide a substitute linerboard sheet made substantially solely of mechanical or chemi-mechanical pulps having strength characteristics substantially equivalent to or in some cases exceed at least some of those of a conventional kraft liner board.

Broadly the present invention relates to a liner board sheet comprising a laminate formed on a paper machine substantially solely from chemi-mechanical pulp and having first surface layer formed from fine fibre chemi-mechanical pulp and a second layer formed of a mechanical or chemi-mechanical pulp or mixtures thereof, at least 50% of said pulp used to form said second layer being a coarse mechanical pulp.

Preferably the fine fibre pulp is formed from Western Red Cedar.

The second layer preferably will be formed from a mixture of Douglas Fir and Western Red Cedar wherein the Douglas Fir comprises at least 50 percent of the mixture.

Preferably the liner sheet will further include a third layer forming a second surface layer on the surface of said liner remote from said first layer, said second surface layer being formed from a fine chemi-mechanical pulp, preferably a Western Red Cedar pulp.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

The term chemi-mechanical pulp is intended to define fibres or pulps produced by a chemi-thermo-mechanical (CTMP) pulping process having a yield of greater than 80% or preferably greater than 85%. The chemical used will preferably be sodium sulfite ($Na_2SO_3$) applied in an amount in the range of about 1 to 20% based on the oven dry weight of the wood from a solution of 5-20% concentration. It is believed that other treatment chemicals under the appropriate conditions will produce similar results. Mechanical pulp is intended to describe thermo-mechanical pulps (TMP) pulps and CTMP pulps having similar yields to that of the CTMP pulps.

Figure 1:
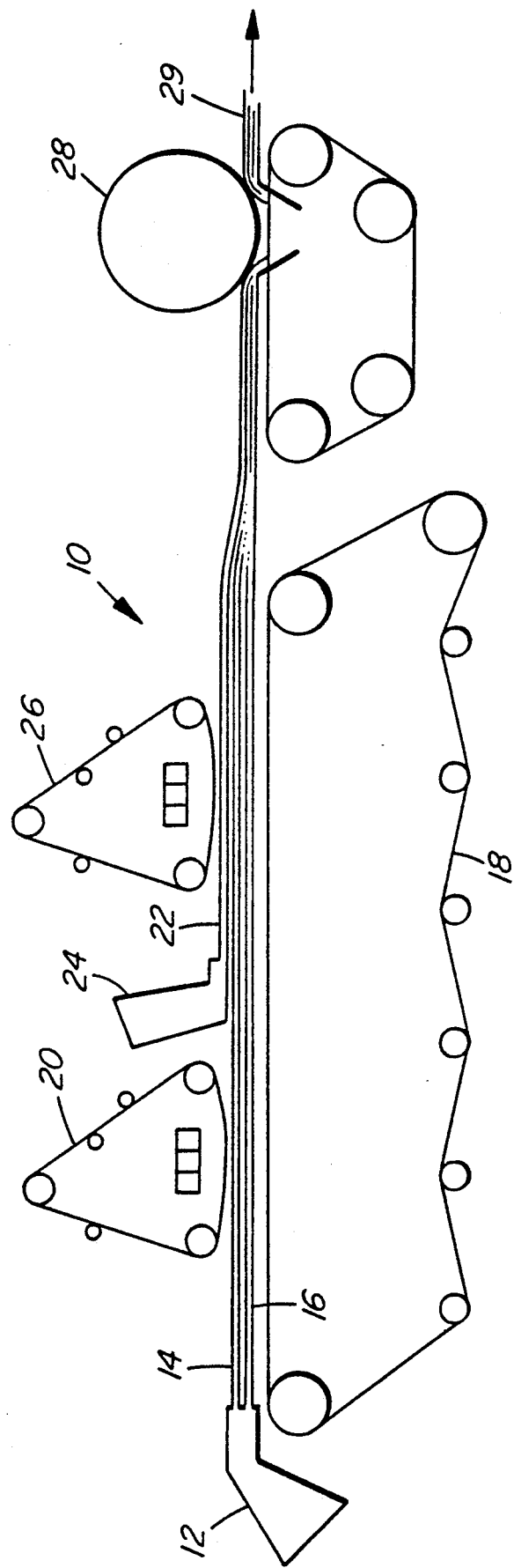
FIG. 1 is a schematic illustration of a paper machine forming section suitable for carrying out the present invention.

As shown in FIG. 1 it is the intention to form a duplex or triplex sheet on a paper machine 10 preferably by laying three separate pulp layers one on the other. In the illustrated arrangement two separate layers are formed by pulps ejected from the head box 12 as indicated by the lines 14 and 16 onto the forming wire 18 and are dewatered in two opposite directions, e.g. downward through carrying wire 18 and upward through covering wire 20 in a conventional manner and a third layer 22 is applied to the laminate so formed on the carrying wire 18 of the machine 10 via a second head box 24. Again dewatering takes place in both directions down through wire 18 and upward through the second covering wire 26 as the pulp travels on the wire 18 and is dewatered to form a paper.

Preferably the sheet formed on the wire is transferred into an extended nip press generally indicated at 28 to form a relatively dry sheet that is passed into the dryers as indicated by the arrow 29. Other forms of pressing in the press section of the paper machine may be used for example impulse drying.

Figure 2:
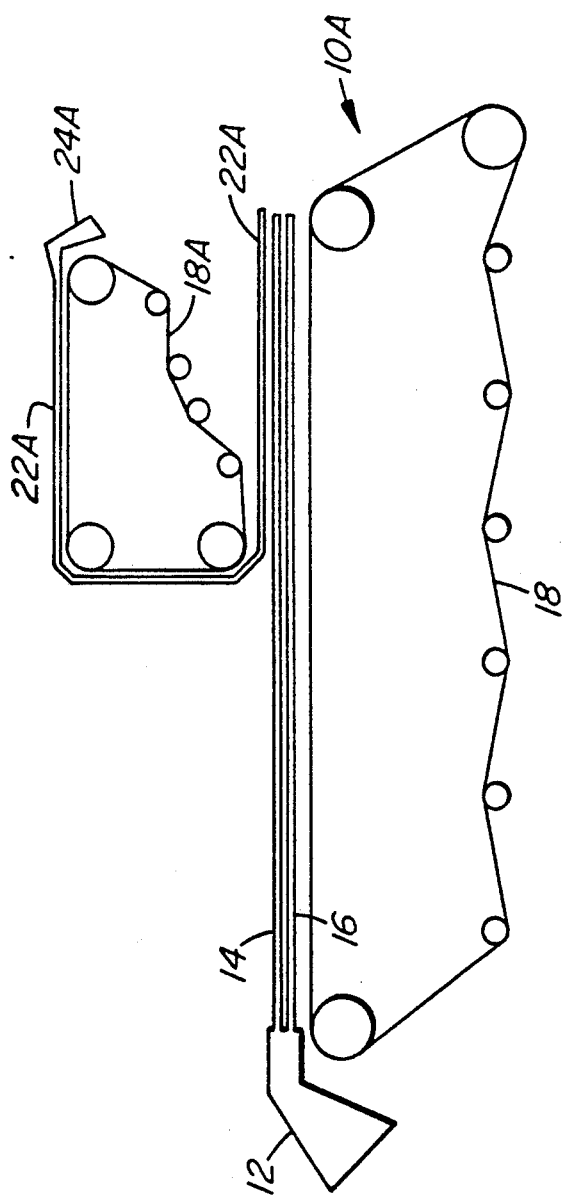
FIG. 2 is a schematic illustration of another form of paper machine forming section.

In the arrangement illustrated in FIG. 2, the paper machine 10A is provided with a dual head box issuing two pulp streams 14 and 16 onto a carrying wire 18 in the same manner as these jets were applied to the carrying wire 18 in FIG. 1. However, in FIG. 2 drainage is all in the downward direction through the carrying wire 18 there being no upward drainage. A third layer is applied from a head box 24 as a jet 22A onto a second forming wire 18A on which the stock is partically dewired and then applied to the exposed surface of the layer 14.

Obviously the layers 14, 16 and 22 or 22A are not discrete layers as illustrated in the drawings but are interfelted at least on their borders to form into a unitary sheet on the wire 18. A specific version of this multi-layered laminated sheet formed on the paper machine 10 is illustrated in FIG. 3.

Figure 3:
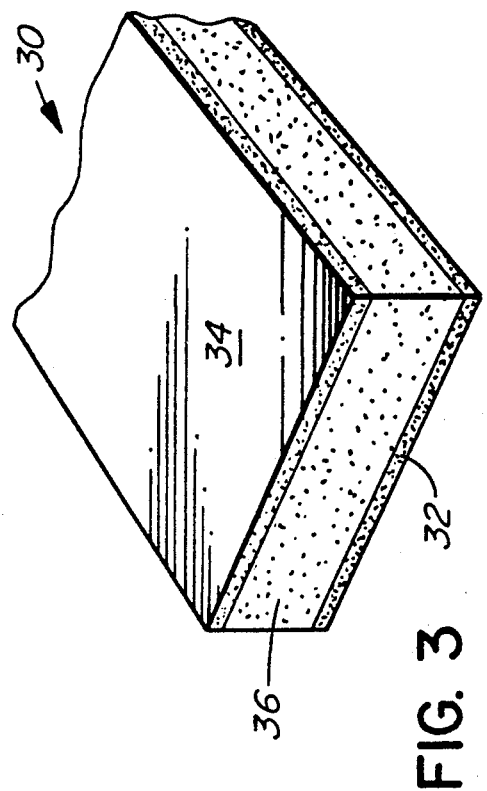
FIG. 3 is a schematic illustration of a liner board formed in accordance with the present invention.

The specific version illustrated in FIG. 3 includes 3 layers but the liner of the present invention may include only 2 layers, for example formed flows 14 or 16 or if a single jet head box is used in place of the two jet head box 12, a single layer would be laid by the head box at the location of head box 12 and a second layer by the head box 20. If desired a third layer may be laid further along forming wire 18.

As shown in FIG. 2 the resultant liner board 30 is composed of three inter-felted layers, namely a first surface layer 32 and a second surface layer 34, with an intermediate or core layer 36 therebetween. If desired one of the layers 32 or 34 may be omitted, however it is preferred to have a balanced liner board with two surface layers 32 and 34 that are made of the same type of pulp and thickness, i.e. similar strength characteristics.

It will be apparent that in any liner board produced the back face and front face may be significantly different, i.e. the layers 32 and 34 may be quite different in that they serve different functions. The layer 34 which is defined as the exposed or front layer may be used for printing and the like, whereas the layer 32 is used as a binding layer for securing the liner to a medium (not shown). Thus the precise characteristics on the two layers 32 and 34 may deliberately be different. Similarly if the one of surface layers 32 or 34 is eliminated and the intermediate layer 36 forms one face of the liner it will be apparent that the coarse fibres of the intermediate layer will facilitate bonding to the corrugated medium and thus the layer 36 will form the back layer, i.e. which the remaining surface layer 32 or 34 will form the exposed or front layer of the liner board.

Specifically at least one of the surface layers 32 must be of a chemi-mechanical pulp that is a fine pulp or fine fibre pulp—term fine pulp as used herein is intended to cover pulps as above defined but more specifically pulps with characteristics substantially equivalent to a Western Red Cedar chemi-thermo-mechanical pulp having a freeness of less than about 300 ml csf.

The intermediate layer will be a coarse pulp or a mixture of coarse and fine pulp with the coarse portion being at least 50%—by the term coarse pulp is meant pulps as above defined and more specifically a mechanical particularly a chemi-mechanical pulp having characteristics substantially equivalent to Douglas Fir pulp at a freeness of 500 csf or less.

EXAMPLE 1

Samples of Western Red Cedar and separate samples of Douglas Fir were produced by soaking 1 kilogram bone dry weight wood chips in a 12% $Na_2SO_3$ and 2% NaOH solution for 10 minutes and then draining for 30 minutes followed by steaming at 130° C. for 10 minutes. The cedar chips, after steaming, contained between 5.8 and 6.2% $SO_3$ based on the dry weight of the chips and the Douglas Fir chips contained 4.3 to 4.7% $SO_3$ based on the dry weight of the chips.

Western Red Cedar had a pulp yield of 88–90% while Douglas Fir had a yield of 90–92% and the specific energy required to attain 500–600 Canadian Standard freeness was 0.7 to 1 megawatt hours per ton for cedar and 0.8 to 1.2 megawatt hours per ton for Douglas Fir.

A plurality of different liners formed substantially solely from the above chemi-mechanical pulps were tested. In each case the 'top' ply (layer 34) was formed from a fine fibre mechanical pulp namely a chemi-thermo-mechanical Western Red Cedar pulp having a freeness of about 250 csf. This layer constituted about 25 percent of the weight of the sheet. The base ply or intermediate layer (36) was formed of chemi-thermo-mechanical pulps namely:

| Sample A - | 33% Western Red Cedar at | 500 cfs |
| | 67% Douglas Fir at | 450 cfs. |
| Sample B - | 33% Western Red Cedar at | 500 cfs |
| | 67% Douglas Fir at | 300 cfs. |

In samples A and B the base ply constituted 75% of the weight of the formed a duplex laminated sheet.

Further samples were made but this time in the form of a triplex sheet wherein the top ply was as before but the middle (36) ply made up 50% of the weight of the board and consisted of

| Sample C - | 100% Douglas Fir at | 450 cfs |
| Sample D - | 100% Douglas Fir at | 300 cfs |
| Sample E - | a mixture of 50% Douglas Fir at | 450 cfs and |
| | 50% Western Red Cedar at | 500 cfs. | and each sample C, D and E had a bottom ply (32) of Western Red Cedar at 500 cfs that formed the remaining 25 percent of the weight of the sheet.

Table I provides a comparison of the strength characteristics of Samples A, B, C, D and E together with a reference showing the characteristics of a conventional kraft liner.

TABLE I

| Sample | A | B | C | D | E | Ref |
| --- | --- | --- | --- | --- | --- | --- |
| Density $g/m^3$ | 0.392 | 0.432 | 0.383 | 0.433 | 0.409 | 0.530 |
| Burst Index $kPa.m2/g$ | 2.2 | 2.5 | 2.1 | 2.3 | 2.3 | 3.5 |
| STFI Compression lb/in | 19.0 | 22.5 | 17.8 | 21.5 | 19.4 | 22.0 |
| Ring Crush lb/6 in | 76.2 | 84.8 | 67.0 | 85.0 | 77.4 | 60.0 |
| Internal Bond lb/4 $in^2$ | 114 | 142 | 72.2 | 131 | 113 | 150 |
| Stiffness $mg/1^3$ in | 6970 | 7200 | 7850 | 6450 | 6290 | 3200 |
| MOE psi $10^3$ | 211 | 251 | 183 | 245 | 221 | 270 |
| Brightness % | 25 | 25 | 25 | 25 | 25 | 18 |
| Smoothness | | | | | | |
| Sheffield ml/min | | | 221 | 224 | 230 | 289 |
| Parker Print Surface (20) u | | | 5.11 | 4.94 | 4.69 | 6.53 |

All of the samples showed characteristics substantially equivalent or in some cases better than the reference sheet (an average Kraft liner board of equivalent basis weight) with the exceptions of the burst index and internal bond. The surface properties of Samples A, B, C, D, and E were all far superior to that of the reference and permit better print quality and in all cases the rig crush was significantly better than the reference. The increase in ring crush indicates a significant improvement in stacking strength.

EXAMPLE 2

These properties were improved by pressing the hand sheets which increased the burst index to approximately the same as that of the reference sheet and increased significantly the internal bond as well as the other structural characteristics of the sheet.

Sheets made in accordance with Sample C were pressed in two presses arranged in series. The pressure of each press and the characteristics of the sheets produced are indicated in Table II.

TABLE II

Effect of Wet Pressing on Triplex Sheet Properties

| TOP PLY: Cedar CTMP @250 Csf | 25% of total sheet weight |
|---|---|
| MIDDLE PLY: D.Fir CTMP @450 Csf | 50% of total sheet weight |
| BOTTOM PLY: Cedar CTMP @500 Csf | 25% of total sheet weight |

ELEMENTARY PROPERTIES

| | | | | | | |
|---|---|---|---|---|---|---|
| First Press psi | 50 | 50 | 50 | 70 | 70 | 90 |
| Second Press psi | 50 | 70 | 90 | 70 | 90 | 90 |
| Basis Weight g/m$^2$ | 204.1 | 204.9 | 203.3 | 204.7 | 205.1 | 06.2 |
| Caliper microns | 533 | 508 | 461 | 495 | 480 | 467 |
| Density g/cm$^3$ | 0.383 | 0.403 | 0.441 | 0.414 | 0.427 | 0.441 |

PHYSICAL PROPERTIES

| | | | | | | |
|---|---|---|---|---|---|---|
| Tear Index mN.m$^2$/g | 10.3 | 9.7 | 9.5 | 9.5 | 9.3 | 9.1 |
| Burst Index kPa.m$^2$/g | 2.1 | 1.9 | 2.3 | 2.2 | 2.2 | 2.2 |
| Break Length m | 3970 | 4060 | 4320 | 3860 | 4100 | 4270 |
| Stretch % | 2.2 | 2.2 | 2.4 | 2.2 | 2.3 | 2.3 |
| STFI Compr lb/in | 17.8 | 17.8 | 19.6 | 18.0 | 19.0 | 19.8 |
| Ring Crush lb/6 in | 67.0 | 64.0 | 69.2 | 66.0 | 70.8 | 76.2 |
| Int Bond lb/4 in$^2$ | 72.2 | 90.4 | 83.0 | 88.0 | 87.2 | 97.0 |
| Stiffness mg/1 3 in | 7850 | 6780 | 5890 | 7240 | 6670 | 5800 |
| MOE psi 10$^3$ | 183 | 203 | 223 | 189 | 198 | 212 |

SURFACE PROPERTIES

| | | | | | | |
|---|---|---|---|---|---|---|
| Shfld Smth ml/min | 221 | 219 | 121 | 181 | 160 | 136 |
| Shfld Por ml/min | 61 | 50 | 35 | 53 | 39 | 38 |
| Gur Por sec/100 ml | 81 | 94 | 131 | 86 | 120 | 122 |
| Parker Print u Surface (20) | 5.11 | 4.69 | 4.41 | 4.54 | 4.44 | 4.24 |

EXAMPLE 3

Different samples were pressed at 50 psi in a first and 90 psi in a second press to show the difference in effect of pressing the samples made with the different pulps and the results are tabulated in Table III.

TABLE III

| Sample | A | B | C | D | E |
|---|---|---|---|---|---|
| Density g/m$^3$ | 0.429 | 0.475 | 0.441 | 0.481 | 0.455 |
| Burst Index kPa.m$^2$/g | 2.3 | 2.6 | 2.3 | 2.4 | 2.4 |
| STFI Compr lb/in | 20.6 | 25.1 | 19.6 | 23.3 | 20.2 |
| Ring Crush lb/6 in | 78.2 | 94.4 | 69.2 | 87.8 | 79.4 |
| Int Bond lb/4 in$^2$ | 114 | 151 | 83.0 | 137 | 119 |
| Stiffness mg/1*3 in | 6540 | 6190 | 5890 | 5650 | 6350 |
| MOE psi 10$^3$ | 241 | 281 | 223 | 281 | 250 |

EXAMPLE 4

The pulp samples were pressed in series in two presses both operating at 90 psi and the results are tabulated in Table IV.

TABLE IV

Effect of 90/90 Pressing Configuration on Properties of Various Triplex Sheet

| Sample | A | B | C | D | E |
|---|---|---|---|---|---|
| Density g/m$^3$ | 0.424 | 0.503 | 0.441 | 0.480 | 0.449 |
| Burst Index kPa.m$^2$/g | 2.4 | 2.6 | 2.2 | 2.5 | 2.5 |
| STFI Compr lb/in | 20.5 | 27.0 | 19.8 | 22.9 | 21.5 |
| Ring Crush lb/6 in | 77.6 | 100.8 | 76.2 | 87.8 | 81.2 |
| Int Bond lb/4 in$^2$ | 123 | 164 | 97.0 | 146 | 119 |
| Stiffness mg/1*3 in | 6970 | 5260 | 5800 | 5530 | 5890 |
| MOE psi 10$^3$ | 230 | 327 | 212 | 282 | 257 |

It will be evident that pressing tends to improve substantially all properties.

EXAMPLE 5

The same set of samples pressed at 50 psi in a first and 90 psi in a second press were further hot pressed (to simulate press drying and/or impulse drying) at 100 psi and 190° C. for 50 seconds. The results are tabulated in Table V which facilitate comparison with standard pine kraft duplex sheet the data on Sample D were intropolated to a sheet density of 0.530 g/cm$^3$ as shown in Table V.

It will be apparent that both ring crush and stiffness are significantly higher than the reference Kraft liner. Similarly the smoothness and thus the printability made in accordance with the invention are much better than the conventional Kraft liner. None of the characteristics of the liner of the present invention are unacceptable. The liner of the present invention thus has greater stacking strength and much better smoothness and printability than the conventional kraft liner.

TABLE V

Intrapolation of Density of Triplex Sheet to 0.530 g/cm$^3$ and Comparison with Ref. Kraft Duplex Sheet

| Furnish Pressing: | Triplex (Sample D) 50/90+ Hot Press | Ref (Kraft Table V) 50/50 |
|---|---|---|
| Basis Weight g/m$^3$ | 207 | 207 |
| Caliper microns | 395 | 397 |
| Density g/m$^3$ | 0.530 | 0.530 |
| Tear Index mN.m/g | 8.2 | 26 |
| Burst Index kPa.m/g | 2.7 | 3.5 |
| Break Length km | 5.115 | 4.600 |
| Stretch % | 2.4 | |
| STFI Compr lb/in | 26.8 | 22 |
| Ring Crush lb//6 in | 100 | 60 |
| Int Bond lb/4 in$^2$ | 146 | 150 |
| Stiffness mg/1 3 in | 5562 | 3200 |
| MOE psi 10 | 331 | 270 |
| Shfld Por ml/min | 19 | |
| Gur Por sec/100 ml | 313 | |
| Shfld Smth ml/min | 190 | 289 |
| Parker Print u | 4.24 | 6.53 |
| Brightness | 22 | 18 |

It will be apparent that hot pressing is very effective for improving the bond strength of CTMP fibres.

A comparison of a conventional liner made of pine kraft pulp (0.53 grams per centimeter$^3$) based on the data obtained and reported in Table V with Sample D, the liner board formed from chemi-thermo-mechanical pulp has
74% higher stiffness
61% higher ring crush
22% higher STFI compressive strength
18% higher MOE
12% higher breaking length
2–7% higher brightness (depending on pressing conditions
2 (PPS) smoother surface and comparable internal bond
but has a
23% lower burst
33% lower porosity
70% lower tear
than the reference Southern pine kraft duplex linerboard sheet.

The performance of the liner board made in accordance with the invention can be further enhanced by incorporating additives such as starch to improve the bonding. However, it is generally preferred to maintain additives to an absolute minimum necessary to obtain the desired characteristics of the liner board.

The above examples have all dealt with chemi-thermo-mechanical pulps (CTMP), but it is believed that thermo-mechanical pulps (TMP), having the proper characteristics, may also be used.

Having described the invention, modifications will be evident to those skilled in the art without departing from the spirit of the invention as defined in the appended claims.

I claim:

1. A liner board sheet formed solely from mechanical pulps comprising a laminate formed on a paper machine and having a first layer providing a first surface layer formed from solely fine fibre mechanical pulp, said fine fibres having a maximum diameter of less than 25 microns and a wall thickness of up to 2.5 microns and a second layer formed by a second mechanical pulp at least 50% of which is a coarse fibre mechanical pulp with the remainder of said second mechanical pulp being said fine fibre pulp, said coarse fibres having a diameter at least 30 microns and a wall thickness of at least 13 microns.

2. A liner board as defined in claim 1 wherein said fine fibre pulp is a chemi-thermo-mechanical pulp.

3. A liner board as defined in claim 1 wherein said coarse pulp is a chemi-thermo-mechanical pulp.

4. A liner board as defined in claim 2 wherein said coarse pulp is a chemi-thermo-mechanical pulp.

5. A liner board as defined in claim 1 wherein said second layer is composed solely of coarse fibre mechanical pulp.

6. A liner board as defined in claim 2 wherein said fine fibre pulp is Western Red Cedar pulp.

7. A liner board as defined in claim 4 wherein said fine fibre pulp is chemi-thermo-mechanical Western Red Cedar pulp.

8. A liner board as defined in claim 1 wherein said coarse fibre mechanical pulp is Douglas Fir pulp.

9. A liner board as defined in claim 2 wherein said coarse fibre mechanical pulp is Douglas Fir pulp.

10. A liner board as defined in claim 3 wherein said coarse fibre mechanical pulp is Douglas Fir pulp.

11. A liner board as defined in claim 4 wherein said coarse fibre mechanical pulp is Douglas Fir pulp.

12. A liner board as defined in claim 5 wherein said coarse fibre mechanical pulp is Douglas Fir pulp.

13. A liner board as defined in claim 6 wherein said coarse fibre mechanical pulp is Douglas Fir pulp.

14. A liner board as defined in claim 7 wherein said coarse fibre mechanical pulp is Douglas Fir pulp.

15. A liner board as defined in claim 1 further including a third layer forming a second surface layer on the surface of said liner board remote from said first layer, said second surface layer being formed from said fine fibre mechanical pulp.

16. A liner board as defined in claim 2 further including a third layer forming a second surface layer on the surface of said liner board remote from said first layer, said second surface layer being formed from said fine fibre chemi-thermo-mechanical pulp.

17. A liner board as defined in claim 3 further including a third layer forming a second surface layer on the surface of said liner board remote from said first layer, said second surface layer being formed from said fine fibre chemi-thermo-mechanical pulp.

18. A liner board as defined in claim 4 further including a third layer forming a second surface layer on the surface of said liner board remote from said first layer, said second surface layer being formed from fine fibre chemi-thermo-mechanical pulp.

19. A liner board as defined in claim 5 further including a third layer forming a second surface layer on the surface of said liner board remote from said first layer, said second surface layer being formed from fine fibre mechanical pulp.

20. A liner board as defined in claim 6 further including a third layer forming a second surface layer on the surface of said liner board remote from said first layer, said second surface layer being formed from fine fibre chemi-thermo-mechanical pulp.

21. A liner board as defined in claim 7 further including a third layer forming a second surface layer on the surface of said liner board remote from said first layer, said second surface layer being formed from fine fibre chemi-thermo-mechanical pulp.

* * * * *